(12) United States Patent
Visser (10) Patent No.: US 11,457,615 B2
(45) Date of Patent: Oct. 4, 2022

(54) EGG HANDLING SYSTEM (71) Applicant: VISCON B.V., s-Gravendeel (NL)

(72) Inventor: Anthony Visser, s-Gravendeel (NL)

(73) Assignee: VISCON B.V., 'S-Gravendeel (NL)

( * ) Notice: Subject to any disclaimer, the term of this patent is extended or adjusted under 35 U.S.C. 154(b) by 3 days.

(21) Appl. No.: 17/252,340

(22) PCT Filed: Jun. 18, 2019

(86) PCT No.: PCT/NL2019/050375
§ 371 (c)(1),
(2) Date: Dec. 15, 2020

(87) PCT Pub. No.: WO2019/245365
PCT Pub. Date: Dec. 26, 2019

(65) Prior Publication Data
US 2021/0259215 A1    Aug. 26, 2021

(30) Foreign Application Priority Data
Jun. 20, 2018  (NL) .................................... 2021159

(51) Int. Cl.
*A01K 43/00*    (2006.01)
*A01K 45/00*    (2006.01)

(52) U.S. Cl.
CPC ............ *A01K 43/00* (2013.01); *A01K 45/007* (2013.01)

(58) Field of Classification Search
CPC ...... A01K 43/00; A01K 45/007; G01N 33/08; B65B 23/08; B07C 1/00; F15B 15/24
USPC .......................................................... 209/510
See application file for complete search history.

(56) References Cited

U.S. PATENT DOCUMENTS

| 4,344,730 A | 8/1982 | Dvorak |
| 6,981,470 B2 * | 1/2006 | Gross ................... A01K 45/007 119/323 |
| 2002/0108488 A1 * | 8/2002 | Bonig ..................... F15B 15/19 92/15 |

FOREIGN PATENT DOCUMENTS

| WO | 0040079 A1 | 7/2000 |
| WO | 2013152970 A2 | 10/2013 |
| WO | 2015037995 A1 | 3/2015 |

OTHER PUBLICATIONS

International Search Report and Written Opinion for International application No. PCT/NL2019/050375, dated Sep. 11, 2019, 11 pages.

* cited by examiner

*Primary Examiner* — Michael McCullough
*Assistant Examiner* — Jessica L Burkman
(74) *Attorney, Agent, or Firm* — KDB Firm PLLC (57) ABSTRACT

A system for handling eggs includes a pusher comprising an axis and an egg support at a free end of the axis. The system for handling eggs further includes a brake associated with the pusher, to selectively apply a brake force thereon.

20 Claims, 7 Drawing Sheets

EGG HANDLING SYSTEM

This is a national stage application filed under 35 U.S.C. § 371 of international application PCT/NL2019/050375, filed Jun. 18, 2019, which claims priority to Netherlands Patent Application No. 2021159, filed Jun. 20, 2018, the entirety of which applications are hereby incorporated by reference herein.

The present disclosure relates to an egg handling system.

In many egg handling systems, eggs are supplied in trays or crates, and need to be individually extracted from separate egg pockets or accommodations in the trays or crates to be treated or handled, for example for injection.

Such a system is for example known from the applicant's own prior publications WO-2013/152970 and WO-2015/037995. Therein, arrays of pushers are provided to lift all or a selection of eggs from a tray or crate, but the present disclosure is not so limited, and could involve a number of pushers for extracting a maximum of less than all eggs from a tray or crate.

Publication U.S. Pat. No. 4,344,730 is also acknowledged, which discloses collective raising or lowering of a complete set of eggs together on a common carrier, without individual control over egg speed or movement. However, the present disclosure relates to improvements over the prior systems, in particular with respect to individual speed or movement control over pushers. In this aspect, further acknowledged is WO-00/40079, which discloses a system having an egg engaging member per individual egg with an injector and a magnetic brake configured to arrest the injector, once a needle thereof has penetrated past the amnion or allantois and into fluid inside an egg.

To this end, the present disclosure relates to a system for handling eggs, comprising for each individual egg:
- a movable pusher from a group at least comprising an extender having an axis and an egg support at a free end of the axis, a gripper and an injector;
- a brake associated with the pusher, wherein the brake is configured to selectively apply, on the pusher, one of: a high brake force to fixedly engage the pusher; a low brake force to effectively allow free sliding movement of the pusher relative to the brake; and an intermediate brake force to allow the pusher to slip along the brake. In the aforementioned prior systems, pushers comprised a cylinder, but the present disclosure is not limited thereto and a moveable or slidable axis may even be employed as a carrier of or for the egg support.

The brake allows speed control over the pusher, and in particular but not exclusively the cylinder thereof, if present, to avoid impacts, when egg supports approach eggs to be pushed out of the trays or crates, or when lifted eggs on egg supports approach a handling position, for example for injection of the eggs. The brake may even be activated with the egg support in a handling or processing position, for example to completely immobilize at least the egg support or allow a predetermined degree of play, in particular during handling or processing, such as injections. In particular though not exclusively when a pneumatic cylinder is used, but also when a hydraulic cylinder is used, which exhibits a degree of play, this play may hamper or hinder injection into eggs at or to a predetermined depth, where pneumatic cylinders are more prone to yielding under pressure, such as needle pressure for injecting an egg, before and after the injection needle pierces the egg shell. Likewise, when the pusher is shortened to be retracted, speed may be lowered, when an egg support approaches the tray or crate to re-insert the injected egg into its pocket or accommodation. The brake may apply a high brake force to fixedly engage the shaft and drag the shaft along in an axial movement, or a relatively low brake force to allow the shaft to slide freely along the brake, or an intermediate brake force to push an egg on the egg support against a processing or handling position, for example for injection, and prevent the egg from being crushed, as the brake can then frictionally slip along the shaft, which shaft is thereby immobilized with the egg on the egg support in the processing or handling position while the support or the like of the brake continues moving. It is further noted that the present disclosure allows for full movement and/or speed control of the pusher per each individual egg, obviating a need for common movement elements, such as a common ascent or descent module, such as a lift plate, for a plurality of pusher in combination. However, a common movement element may additionally be provided. All movements of the pusher per each individual egg can be controlled using the above defined brake, acting each on the associated pusher with the selected one of three brake force levels to fixedly engage or release the pusher, or allow it to slip along the brake.

According to the present disclosure, many more detailed embodiments may reside within the scope of protection according to the appended independent claim, as will be apparent from the below indications in claim expression, the dependent claims, and the below embodiment description.

In a particular embodiment, the axis is one of a piston rod and a cylinder housing of a cylinder, and the cylinder is one of a hydraulic cylinder and a pneumatic cylinder. Additionally or alternatively, the axis may comprise a slidable shaft with a guide, which slidable shaft is moveable relative to the guide in a lengthwise direction of the shaft In a particular embodiment, the brake is configured to apply a speed controlling force on the pusher during at least one stage of egg handling from a group comprising: extending the axis, retracting the axis, and accepting an egg on the egg support.

In a particular embodiment, the brake is configured to apply an immobilising force on the pusher for immobilization of at least the egg support, at least during egg handling, such as injection.

In a particular embodiment, the brake is a friction brake, configured to apply a selectively adjustable friction force on the pusher.

In a particular embodiment, the brake is connected to a carrier. Then, the carrier may comprise an axial drive for displacement of the brake in or along a lengthwise direction of the axis. In such embodiments, the brake may comprise a brake element arranged on a radial drive to selectively extend and retract the brake element between the carrier and the pusher. The radial drive may comprise a pneumatic element. Additionally or alternatively, the radial drive may comprise an expandable element. The expandable element may comprise a bellows.

In a particular embodiment, the brake comprises a clamp configured to engage a portion of the pusher. The clamp may comprise at least two clamp parts, wherein one of the clamp parts may be formed by a housing wall having an articulated wall surface, which is shaped in correspondence with a portion of the pusher to be clamped.

In a particular embodiment, the system further comprises at least one additional pusher and an associated additional brake, and a controller to individually control at least the brake and the additional brake. The system may further comprise a sensor associated with the pusher and an additional sensor associated with the additional pusher and both the sensor and the additional sensor being connected to the controller. The sensor and the additional sensor may be individually selected from a group, at least comprising a speed sensor, a proximity sensor, a displacement sensor and the like.

Based on the above indications of features of the present disclosure in terms of the appended claims, below an embodiment description is provided with reference to the appended drawing, where the scope of protection of the present disclosure according to the appended claims is by no means limited to any specific aspect or feature of the below discussed and in the drawing shown embodiments. Such exemplary embodiments are shown in the accompanying drawing, which shows distinct embodiments wherein the same or similar elements, components and/or aspects can be designated with the same or a similar reference numeral, and in which:

Figure 1:
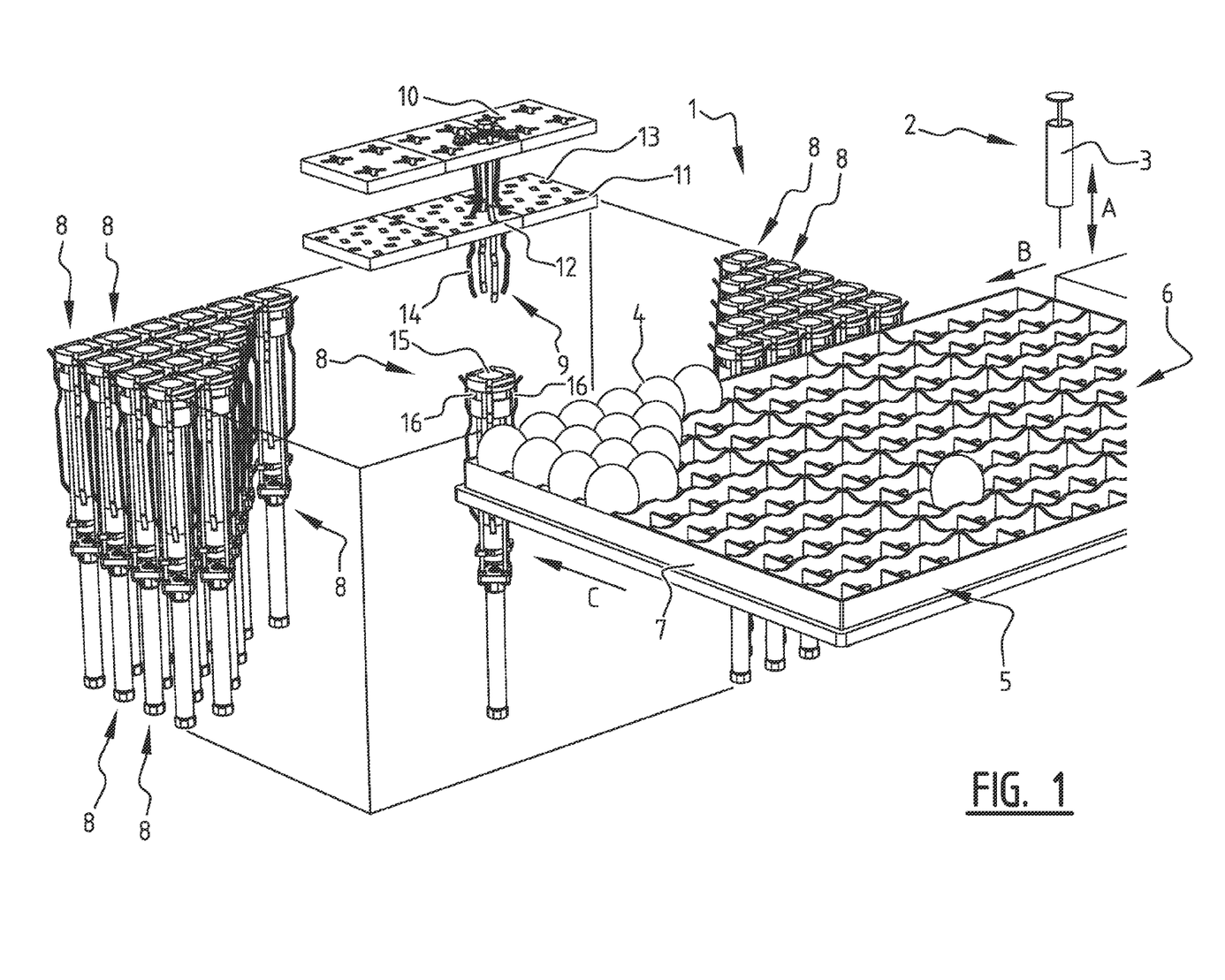
FIG. 1 is a schematic and perspective view of a system according to the present invention together with a transport crate.

A system 1 according to the present invention is shown schematically in FIG. 1. Device 1 comprises a schematically shown injecting station 2 with injectors 3, only a single one of which is shown, which can be movable up and downward in the direction of double arrow A in order to administer preferably a vaccine or nutrients and/or possibly antibiotics, liquid or the like, or to extract material from the inside of an egg 4. At least some of the injectors 3 may be pushers in the sense of the present disclosure, when movable up- and/or downward, by providing a below disclosed brake in association with the injectors, to allow a free moving state of the injectors 3 relative to the associated brakes, a slipping state and a fixed state. Alternatively, eggs are pushed onto stationary injection needles.

Eggs 4 are accommodated here in a tray or crate 5. Such a crate 5 need not necessarily comprise a bottom and comprises at least a lattice 6 enclosed by a frame edge 7. In the case of an open embodiment of the bottom of crate 5, pushers 8 to be further described herein below can protrude through passages in lattice 6 to push eggs 4 up out of crate 5, and preferably also align the eggs, to present the eggs 4 to the injectors 3 in an optimal alignment, which is normally is upright or vertical as possible.

Following treatment of eggs 4 at injecting station 2, pushers 8 are shortened to lower injected eggs back into crate 5, which is thereafter removed from injecting station 2 in the direction of arrow B and/or arrow C and/or carried to an arrangement of another assembly of a number of pushers 8. Consequently, pushers 8 can be used in a plurality of different types of egg handling.

Pushers 8 may be arranged at injections station 2 and/or at gripper station 9, and are disposed in a number of rows and/or arrays, preferably comprising as many pushers 8 as there are eggs in a crate 5. As crate 5 is carried over pushers 8 at the injection station 2 and/or in the direction of arrow C, eggs 4 in crate 5 are positioned between pushers 8 and in each case an associated injector 3 or gripper 9.

Each gripper 9, only a single one of which is shown in the figure, comprises four legs 14. Each of the legs 14 or a selection of the legs 14 can be manufactured from an elastically bendable material which can give way or wherein legs 14 can be pressed apart, for instance using a spreader 11, and can thereafter again take on the original form as shown in FIG. 1. It is thus possible that gripper 9 can be pressed over an egg, wherein optionally prior hereto legs 14 can be pressed apart using spreader 11.

An assembly of grippers 9 can be arranged on a single suspension 10, or grippers 9 can each be arranged on a separate suspension 10. In the embodiment in the accompanying figures a spreader 11 is also shown in an assembly with suspension 10. Such a spreader 11 comprises a plate-like element 12 with slotted openings or passages 13. Legs 14 of gripper 9 protrude through the slotted openings or passages 13.

Legs 14 of gripper 9 are elongate and have substantially the form of an inverted question mark ¿ of which a straight part is arranged on suspension 10 and a curved part with a form corresponding to the outer periphery of an egg is oriented downward in FIG. 1 for the purpose of receiving an egg 4 therein. It is possible, particularly in combination with the elongate legs 14 in the form of an inverted question mark and the slotted holes or openings in plate 12 of spreader 11, to achieve that legs 14 of gripper 9 are pressed apart when spreader 11 is displaced upward.

A part of a plate 12, which is enclosed by openings or holes 13 associated with a single gripper 9, can be designated a contact block in the sense of the present invention; legs 14 of a single gripper 9 can be moved away from and/or toward and against each other in order to open and/or close gripper 9, particularly on the basis of the resilient or elastic properties of the material of the legs, by moving the block 12 of spreader 11 that is associated with the single gripper 9 up or down, relative to gripper 9. In an alternative or additional embodiment it is possible for each of the legs of a gripper to be driven using a drive in order to open and/or close the gripper.

All displacements and movements can be controlled by a control (not shown in detail) such as a microcomputer or another programmable embodiment. Manual operation cannot be precluded as possible embodiment of a system according to the present invention.

Crate 5 with eggs 4 therein comprises the lattice 6 which has openings on the underside. Already noted above is that pushers 8 can be inserted through these openings on the underside of crate 5. The pushers 8 shown in the figures comprise an egg support 15 for supporting an egg and at least two arms 16 movable reciprocally along the base for the purpose of aligning an egg 4 accommodated on the egg support 15. Arms 16 may protrude from the support in a longitudinally stationary manner, only to yield outward, when an egg 4 sinks down between arms 16 onto support 15, as support 15 is raised through one of the openings in the lattice 6. It is in this way possible to achieve that eggs 4 are pushed up out of crate 5, which eggs 4 have a longitudinal axis and can thus be displaced with the longitudinal axis essentially upright from crate 5 using pushers 8, so that eggs 4 can be presented in a vertical or at least upright position of the longitudinal axes thereof to injectors 3 for injection or to grippers 9 for further displacement, manipulation, processing and so on of eggs 4.

Figures 2, 3:
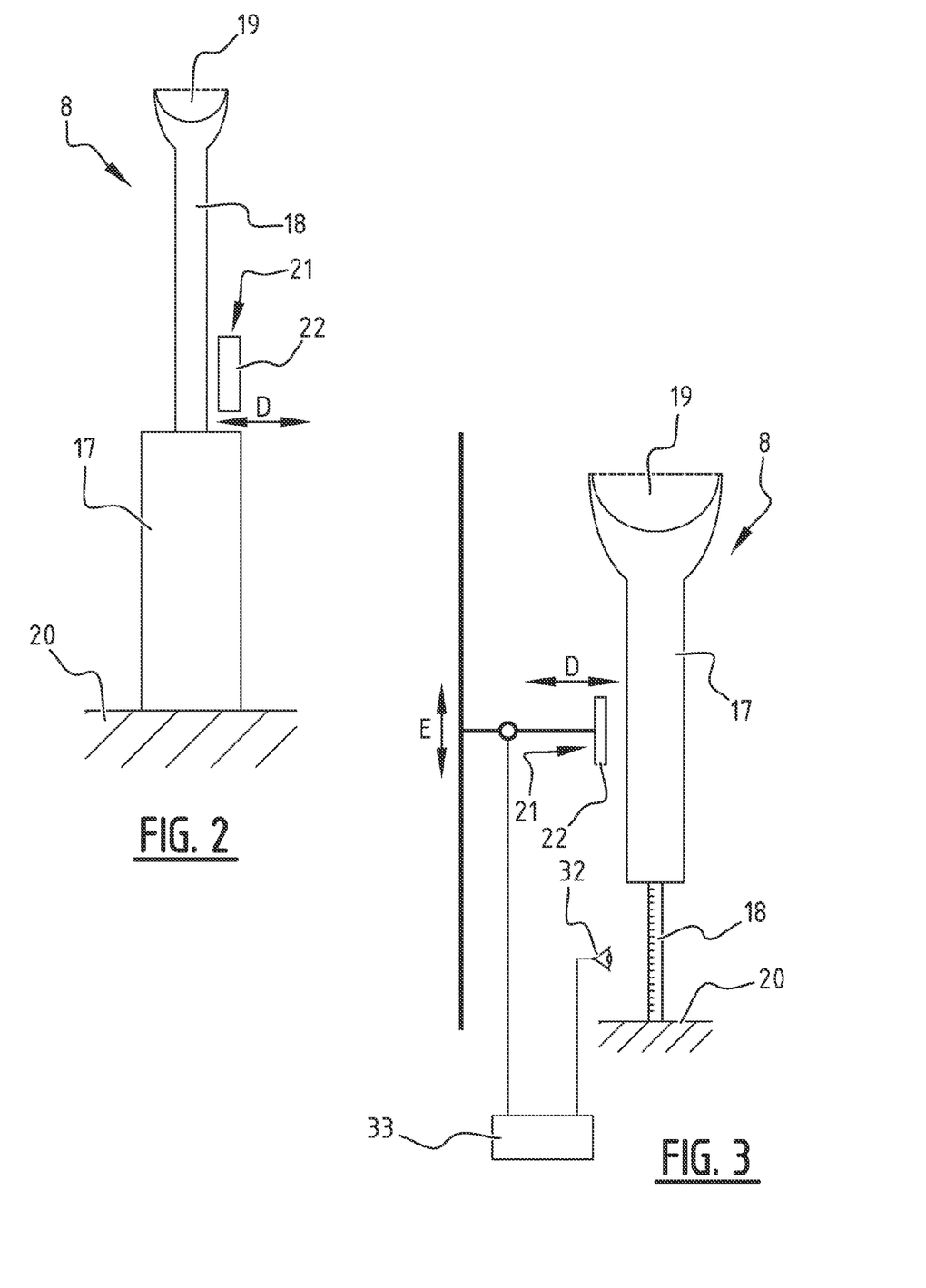
FIG. 2 and FIG. 3 show schematic representations of distinct embodiments of pushers in conjunction with brakes.

FIG. 2 exhibits an schematic embodiment of a pusher 8 in a first embodiment, having a cylinder house 17 fixed in a stationary manner on a base 20, and a piston rod 18 with an egg support 19 on a free end of the piston rod 18. The indication that the cylinder house 17 is stationary relates to the position thereof relative to the base 20, and if the base 20 is moveable, then the cylinder house 17 will move along with the base 20. A schematically shown brake 21 is configured to act on/against the piston rod 18. The cylinder defined by the cylinder house 17 and the piston rod 18 may be hydraulic or pneumatic.

Conversely, in the embodiment of FIG. 3, the piston rod 18 is fixed to base 20, and the cylinder house 17 has egg support 19 at its free end, where schematically represented brake 21 is configured to act on cylinder house 17.

Both in FIGS. 2 and 3, brake 21 comprises a brake element 22 which can be forced against and retracted from the cylinder house 17 in FIG. 3 and/or piston rod 18 in FIG. 2, as indicated with double arrow D. In FIG. 2, the cylinder house 17 is fixed to a base 20, and in the embodiment of FIG. 3, the cylinder is turned up-side-down and the piston rod 18 thereof is fixed to base 20. The force or pressure exerted by the brake element on rod 18 or house 17 will determine whether the extending or retracting movement is unrestricted, slowed down (for example when approaching an egg in tray or crate 5 to be put on egg support 19, or when approaching a gripper 9 with an egg on support 19), or even completely arrested (for example to hold an egg 4 still on the egg support for injection). In addition to or as an alternative for the embodiments in FIGS. 2 and 3, a brake 21 may even act on the egg support 19 and/or more than one of the cylinder house 17 and the piston rod 18.

Figure 4:
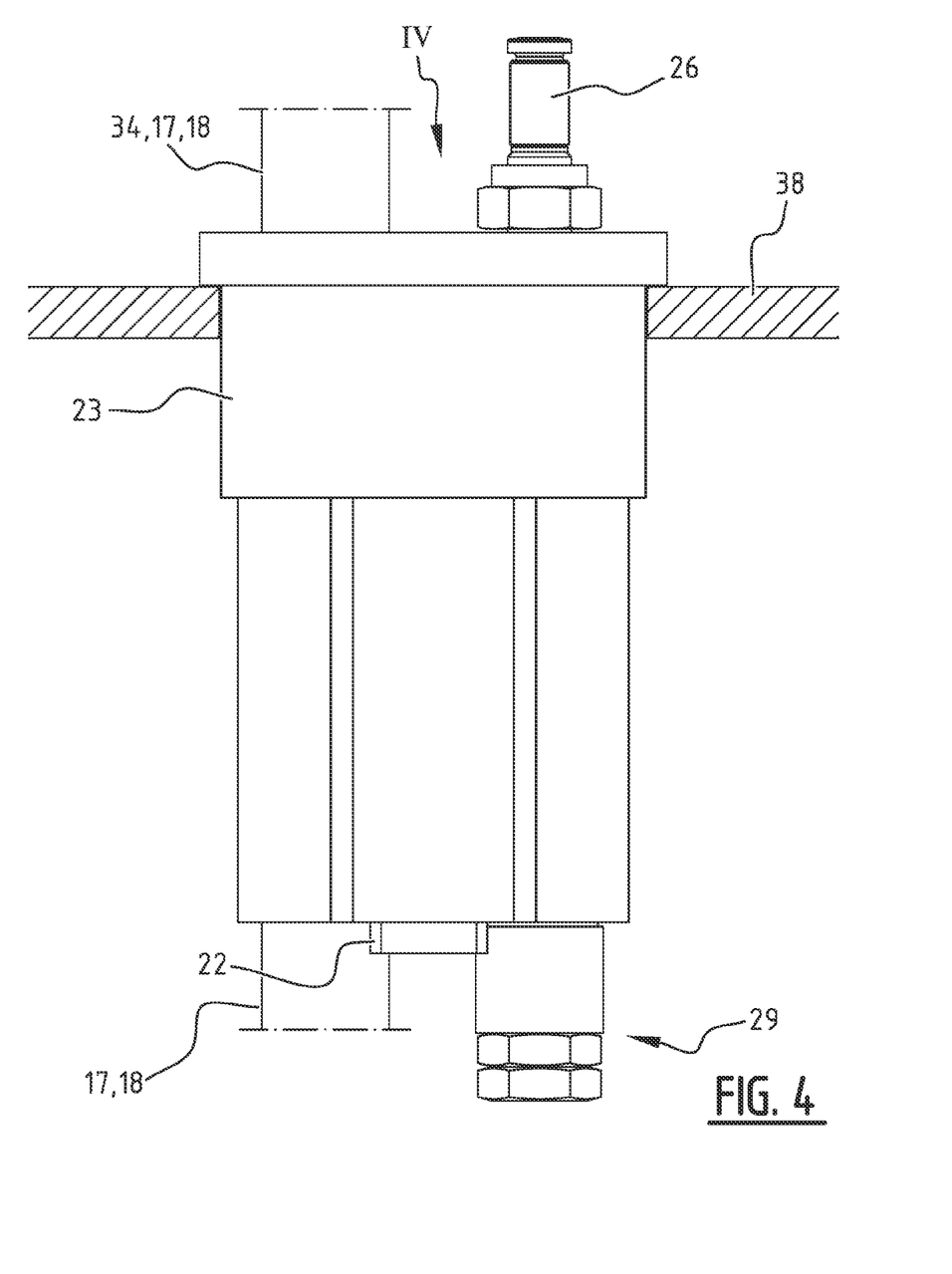
FIGS. 4, 5 and 6 disclose a detailed embodiment of a brake.

FIGS. 7A-7E show subsequent stages of a system with the brakes 22 acting on shafts 18, as in FIG. 4. Therein, lower plate 38 is vertically moveable (arrow E), carrying brakes 21 for individual control over rods 18. Rods 18 extend through a guide plate 40, in the direction of a supplied tray 41 with eggs therein. Overhanging the supplied tray 41 is an abutment plate 42, which may have concave recesses for eggs to be pushed into, to be injected. Above abutment plate 42 are injectors 42 of which injection needles are oriented downward to extend to and when activated also through passage holes at the egg positions defined by for example the aforementioned recesses. Plate 38 can be made to move reciprocally in the direction of arrow E, using for example an electric motor (not shown). FIGS. 7A-7E exhibit five subsequent stages of upward movement of plate 38.

To illustrate the operation of the system, it is assumed that tray 41 contains three eggs, of which the leftmost egg is bad, while the middle egg and rightmost egg are good to be injected but the middle egg is larger than the smaller rightmost egg.

Leftmost egg 4 is determined to be "bad" and should not be subjected to injection. Brake 21, that is associated with this left egg, is disengaged from its associated rod 18. As plate 38 is made to move upward in FIGS. 7B-7E, left rod 18 freely slides through its associated brake 21, and left egg is not pushed up top abutment plate 42 to remain in tray 41.

Figure 7A:
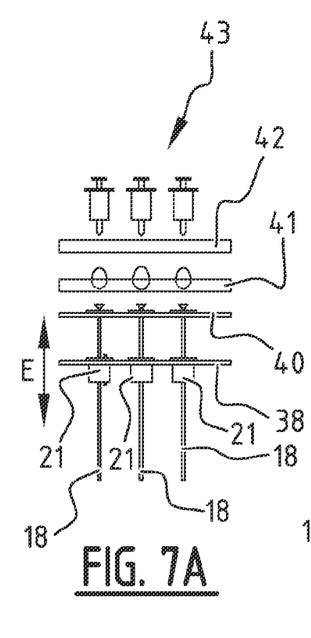
FIG. 7A-7E show a system in subsequent stages.
Figure 7B:
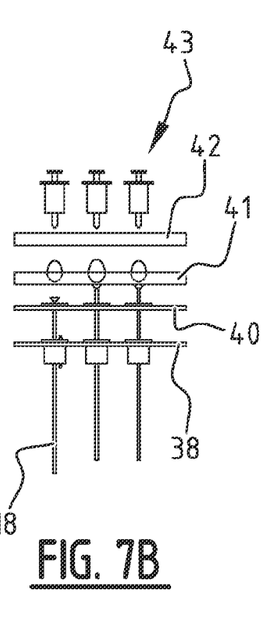
Figure 7C:
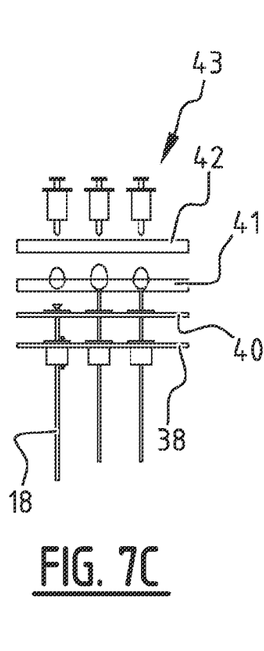
Figure 7D:
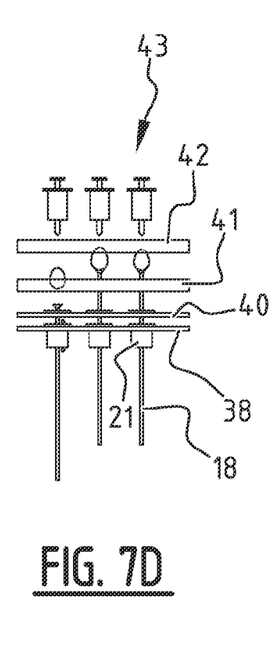
Figure 7E:
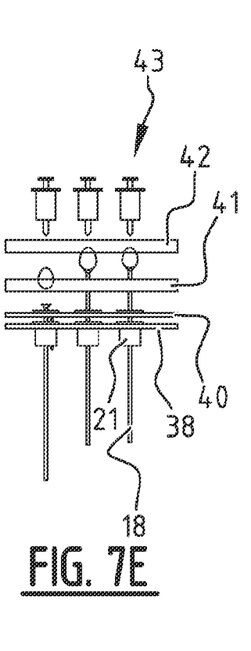

The middle and right eggs are determined to be injected, and are, in FIGS. 7C-7D, pushed up out of tray 41, and up against abutment plate 42. Middle and right rods 18 support their eggs at the same height, and consequently, because the middle egg is larger, it reaches the abutment plate 42 in FIG. 7D before the smaller right egg. When the larger middle egg contacts the abutment plate 42, the associated middle brake 21 is controlled to reduce the brake force on the associated rod 18 to a level that allows the middle rod 18 to frictionally slip through its brake 21. This is performed for all eggs in FIGS. 7D-7E, until all eggs are in egg positions in concave recesses in the underside of the abutment plate 42, as in FIG. 7E, to thereafter activate optional punches (not shown) to prepare the eggs for injection, and subsequently also activate injectors 43.

The brakes 21 could also be adjustable clamps. The retaining force of such brakes or clamps, acting on the associated rods 18, is preferable set to a level to engage and raise rods loaded with only the weight of an egg towards the abutment plate 42, but when the slightest additional resistance in addition to the weight of eggs is encountered, i.e. when the eggs contact abutment plate 42, the rods are allowed to frictionally slide through their brakes, which then continue to exert the same braking or clamping force. Additionally, it may be possible to actively drive brakes 21 to reduce braking or clamping force on their rods 18 as the eggs carried thereon come in contact with abutment plate 42, for which contact detectors at abutment plate 42 or any alternative therefore may be used.

Rods 18 are, in the embodiment of FIG. 7, not cylinder rods and the deployment of cylinders for individual movement of the rods 18 may thus be avoided. Even with individually controlled cylinders, pneumatic or hydraulic, based on only the air or fluid pressure supplied thereto, break of eggs could be problematic. However, cylinders are not necessarily excluded from the present disclosure, as combination thereof with brakes or clamps may yield more reliable configurations to avoid breakage of eggs, as for example in the embodiments of FIGS. 2 and 3. In the embodiment of FIG. 7, an electric motor may be provided to move plate 38, and control over moveable plate 38 defining a single common moving element in the vertical direction can be achieved more reliably, the by using individually driven cylinders, in which a pressure may build up that could result in eggs breaking.

Figure 8:
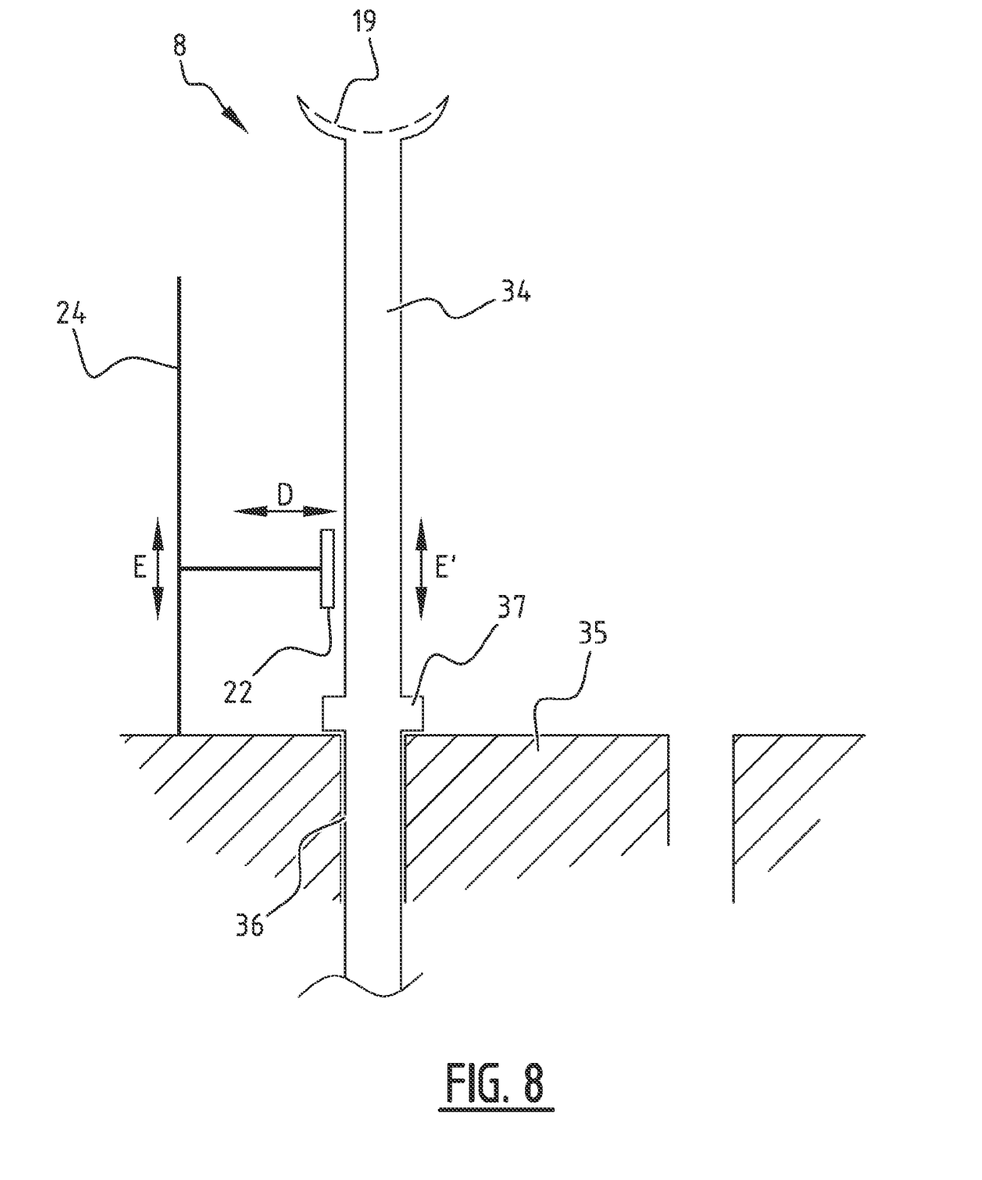
FIG. 8 shows an alternative embodiment for in particular the pushers of FIGS. 2 and 3 and the system in accordance with FIG. 7.

In FIG. 8 an alternative embodiment is shown. Therein, a slidable shaft 34 replaces the cylinder 17, 18 of FIGS. 2 and 3. The shaft 34 is slidable in a guide formed by passages 36 in a body 35, and comprises a cam, for example an optional annular flange 37 defined at a lower position of the slidable shaft 34, which cam 37 can rest on body 35. When the brake element 22 is held remote from shaft 34 in the position shown in FIG. 8, the shaft remains immobile. However, when brake element 22 is pushed against the shaft 34 with a high brake force in a direction along double arrow D to the left in FIG. 8, and moved upward in the direction of arrow E relative to carrier 24, on which the brake element 22 is suspended, the shaft 34 is taken along to be extended from or retracted in body 35. When the brake force is taken off completely, the shaft remains or drops to the lowermost position thereof, shown in FIG. 8. Flange 37 is optional in that the brake element 22 may be driven to prevent the shaft 34 from dropping out of the body 35, or an abutment can be arranged under shaft 34, from which abutment the shaft can be lifted by the brake. When an intermediate brake force is applied, the shaft 34 may slip along the brake element 22, or vice versa, either during an upward or during a downward movement of the brake element 22 relative to the body 35. When an egg on egg support reaches the injector 3 of FIG. 1, while the brake up to that point applies a high brake force, upward movement results in the egg abutting against the injector 3, and the brake force may then be lowered to allow the brake element 22 to frictionally slip along the shaft 34, while moving up relative to the body 35. Consequently, a movement E' of the shaft 34 is not identical to movement E of the brake element 22 along carrier 24, to avoid an egg being crushed against injector 3.

This allows a single drive to vertically (E) move a plurality of brake elements 22 in unison, for instance using a collective lift plate, which is vertically moveable and to which the brake elements 22 may be attached, where the brake elements 22 are individually controlled horizontally (D) to take into account that it is not desired to lift unviable, dead and the like eggs, and/or that due to size differences between eggs, individual eggs may reach injectors 3 at different moments. When individual eggs reach the intended injectors 3, the associated brake elements are controlled to lower the brake force exerted thereby on shafts 34, and thereafter, when all eggs have reached their destined injectors 3, all brake elements are again controlled to exert the higher brake force to immobilize the eggs for injection. After injection, the brake force may be kept high, while all shafts 34 are lowered in unison until the largest eggs on the lower egg supports at injection reach the tray, and then the brake force of all brake elements may be lowered to the intermediate level, to allow all eggs to descend slowly into pockets or compartments of the tray or crates as the shafts frictionally slip along the brake elements. Additionally or alternatively all shafts may be allowed to slip along the associated brake elements during descent thereof, thus omitting the high brake force after injection.

The shafts 34 may be bar shaped with a circular, oval, triangular, square, hexagonal or any other appropriate cross section. The shape of brake element may be easily adjusted thereto.

Figure 5:
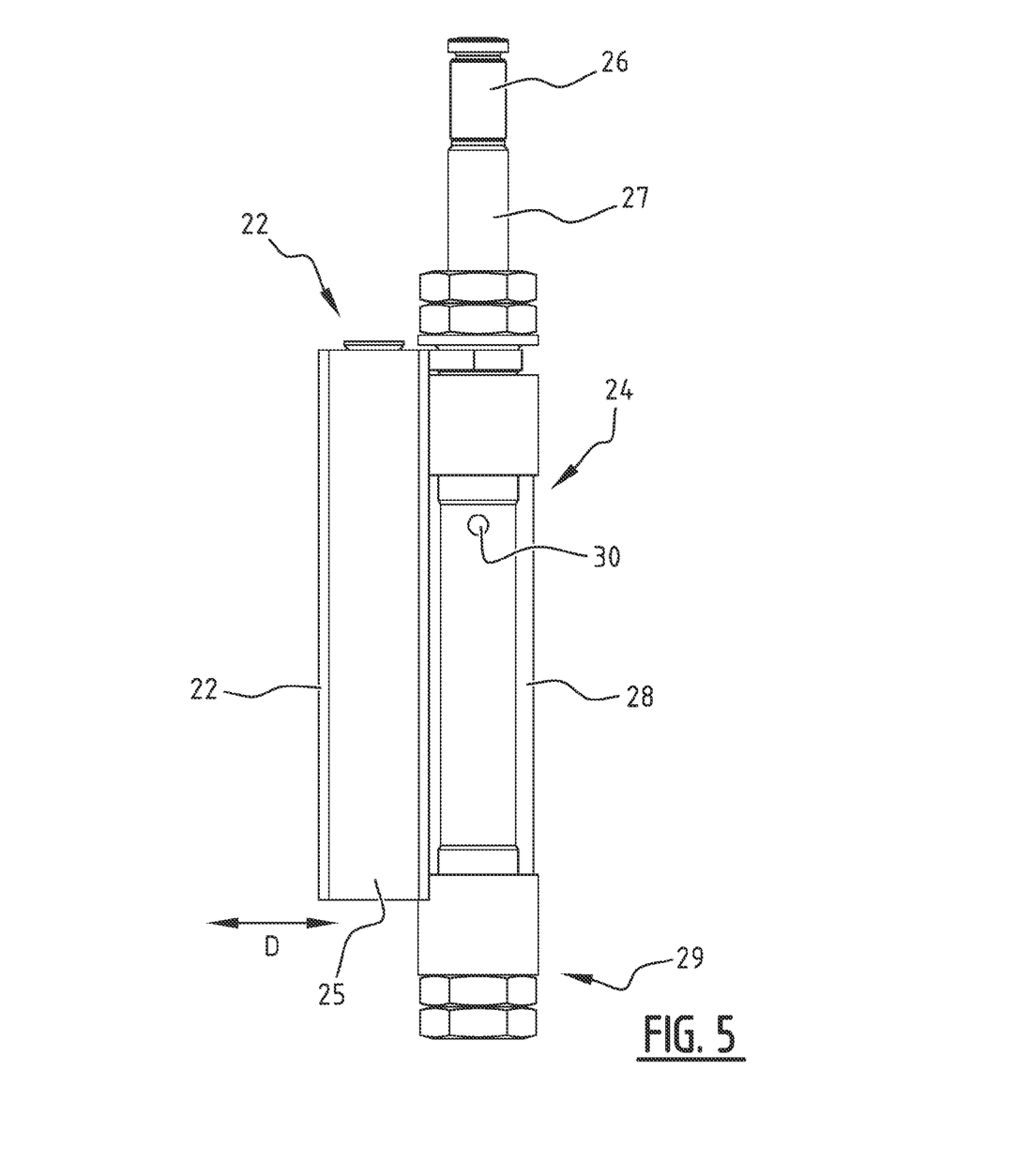
Figure 6:
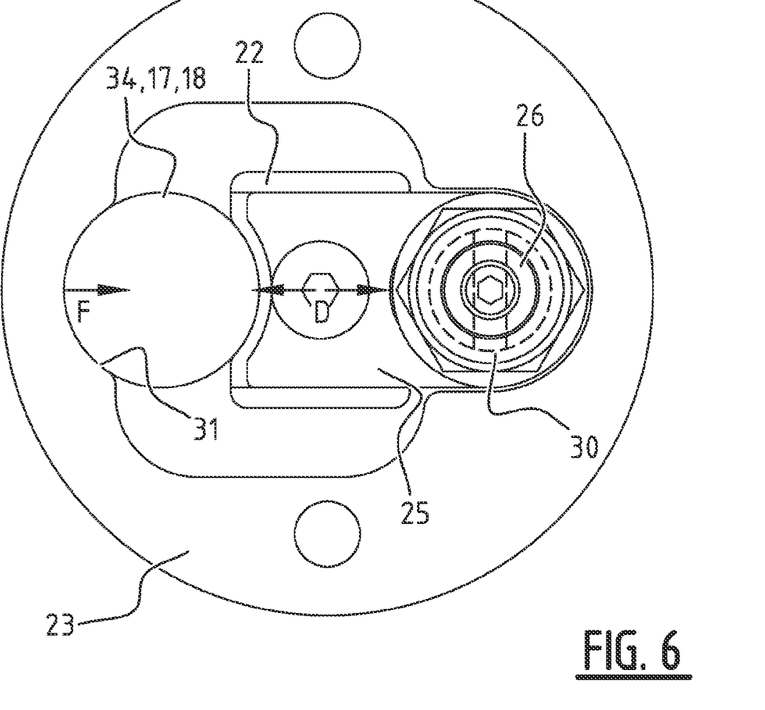

The configuration of an exemplary brake 21 is shown in more detail in FIGS. 4-6, and comprises a housing 23, through which at least one of the cylinder house 17, piston rod 18 and shaft 34 (in accordance with the embodiments of FIGS. 2, 3 and 7) extends. Housing 23 is suspended in a plate 38, together with a plurality of additional and essentially identical housings 23 which may all be arranged in passages or holes in plate 38, to achieve a configuration like the one in FIG. 1.

The brake 21 may be connected to a carrier 24 in FIG. 3, to which brake housing 23 may be connected, or—as in the case of the shown embodiment—of which brake housing 23 forms a part. Such a carrier 24 may be connected fixedly to base 20 and may comprise an axial drive for displacement of the brake 21 in a direction of lengthening and shortening of the cylinder along double arrow E. This allows for accurate placement of the brake element 22 relative to the cylinder 17, 18 or shaft 34, and may even allow for extension or retraction of the cylinder 17, 18 or shaft 34, when the brake element 22 is forcibly pressed against the cylinder house 17 or the piston 18 or the shaft 34 and frictionally drag cylinder house 17 or piston rod 18 or shaft along in a movement indicated by double arrow E.

The brake element 22 is arranged on a radial drive to selectively extend and retract the brake element 22 in the direction of double arrow D between the carrier 24 and cylinder house 17 or the piston rod 18 or shaft 34 of pusher 8.

In the shown embodiment, the radial drive comprises a pneumatic element 24 and an expendable element like a bellows 25. A connector 26 allows entry of pressurized air into a tube shaped conduit 27 on which a silicon hose 28 is arranged. An end of conduit 27 opposite the connector 26 is closed off with a stop 29. A conduit 30 is provided to expel air under pressure from the interior of the conduit 27 into the bellows 25, on which brake element 22 is arranged to be extended or retracted along double arrow D.

As shown in FIG. 6, when brake element 22 is extended against cylinder house 17, piston rod 18 or shaft 34, the cylinder house 17, the piston rod 18 or shaft 34 is clamped between the brake element 22 and a curved inner surface 31 of brake housing 23, which curved inner surface may be roughened for good frictional engagement of cylinder house 17, piston rod 18 or shaft 34, and in any case exert a reaction force in the direction of arrow E.

Thus the brake 21 comprises a clamp configured to engage a portion of the cylinder house 17, the piston rod 18 or shaft 34 of the pusher 8. Clamp parts of the clamp are defined by the brake element 22 and the curved and therefor articulated inner surface 31 of the brake housing 23.

The curved, articulated inner surface 31 of the brake housing 23 is shaped in correspondence with a portion of cylinder house 17, the piston rod 18 or shaft 34 of the pusher 8 to be clamped.

As is apparent from FIG. 1, a system of the present disclosure may comprise a plurality of pushers 8 and associated brakes 21, even though the brakes are discussed only in any detail in relation to FIGS. 2-6. Preferably, a controller 33 is provided to individually control brakes 21, as the cylinders 17, 18 or shafts 34 of pushers 8 may exhibit individual behavior. For example, one of the pushers 8 may extend more easily and arrive at the tray or crate 5 quicker than other pushers. At such an extent, the controller should slow down the faster moving pusher using the brake 21 associated therewith. For measuring individual pusher performance, sensor 32 for measuring the extension of cylinder 17, 18 or of shaft 34 may be provided, to send information about extension of the individual cylinders 17, 18 or shafts 34 to the controller 33, which may the drive the brakes 21 of the individual cylinders 17, 18 or shafts 34 based on this information. Other than or in addition to position sensor 32, sensors may be individually selected from a group, at least comprising a speed sensor, a proximity sensor, a displacement sensor and the like.

It will be apparent that diverse additional and alternative embodiments will occur to the skilled person after the foregoing disclosure of details and features of the possible embodiment shown specifically in the figures, to which the present invention is by no means limited. It is thus possible for other types of brakes to be employed than the pneumatic based brake of FIGS. 4-6. The injecting station and the displacement of crates with eggs between the injecting station and assemblies of pushers and grippers is optional and serves only to illustrate conditions, functionalities and processes or manipulations wherein eggs are lifted from crates or trays, with more care, and subsequently processed by injection, gripping, or any other manipulation. It is possible for the controller to be configured to control the pusher(s) and/or the gripper(s) and even injectors individually per egg, for instance subject to detection results in respect of life in the egg, fertility of the egg or even of a detected gender of an embryo in the egg. Pushers to be controlled individually can be actuated here so as to selectively present those eggs with desired properties to the grippers for gripping or injectors for injection thereof, wherein eggs with less desirable properties can remain behind in the egg drawer, container or crate and can thus be separated from the eggs with more desirable properties, and can even be discharged without having been lifted. It is additionally or alternatively likewise possible for the grippers to be controlled individually to only actually grip a selection of all the eggs presented for gripping when these eggs have the (more) desirable properties.

The invention claimed is:

1. A system for handling eggs, comprising for each individual egg:
  a movable pusher comprising an extender having an axis and an egg support at a free end of the axis;
  a brake associated with the pusher, wherein the brake is configured to selectively apply, on the pusher, one of:

a high brake force to fixedly engage the pusher;
a low brake force to effectively allow free sliding movement of the pusher relative to the brake; and
an intermediate brake force to allow the pusher to slip along the brake.

2. The system according to claim 1, wherein the axis comprises a slidable shaft with a guide, which slidable shaft is moveable relative to the guide in a lengthwise direction of the shaft.

3. The system according to claim 1, wherein the axis is one of a piston rod and a cylinder housing of a cylinder, and the cylinder is one of a hydraulic cylinder and a pneumatic cylinder.

4. The system according to claim 1, wherein the brake is configured to apply a speed controlling force on the pusher during at least one stage of egg handling from a group comprising: extending the axis, retracting the axis, and accepting an egg on the egg support.

5. The system according to claim 1, wherein the brake is configured to apply an immobilising force on the pusher for immobilization of at least the egg support, at least during egg handling.

6. The system according to claim 1, wherein the brake is a friction brake, configured to apply a selectively adjustable friction force on the pusher.

7. The system according to claim 1, wherein the brake is connected to a carrier.

8. The system according to claim 7, wherein the carrier comprises an axial drive for displacement of the brake in or along a lengthwise direction of the axis.

9. The system according to claim 7, wherein the brake comprises a brake element arranged on a radial drive to selectively extend and retract the brake element between the carrier and the pusher.

10. The system according to claim 9, wherein the radial drive comprises a pneumatic element.

11. The system according to claim 9, wherein the radial drive comprises an expandable element.

12. The system according to claim 11, wherein the expandable element comprises a bellows.

13. The system according to claim 1, wherein the brake comprises a clamp configured to engage a portion of the pusher.

14. The system according to claim 13, wherein the clamp comprises at least two clamp parts.

15. The system according to claim 14, wherein one of the clamp parts is formed by a housing wall having an articulated wall surface, which is shaped in correspondence with a portion of the pusher to be clamped.

16. The system according to claim 1, further comprising at least one additional pusher and an associated additional brake, and a controller to individually control at least the brake and the additional brake.

17. The system according to claim 16, further comprising a sensor associated with the pusher and an additional sensor associated with the additional pusher and both the sensor and the additional sensor being connected to the controller.

18. The system according to claim 17, wherein the sensor and the additional sensor are individually selected from a group comprising a speed sensor, a proximity sensor, and a displacement sensor.

19. A system for handling eggs, comprising for each individual egg:
a movable injector; and
a brake associated with the injector, wherein the brake is configured to selectively apply, on the injector, one of:
a high brake force to fixedly engage the injector;
a low brake force to effectively allow free sliding movement of the injector relative to the brake; and
an intermediate brake force to allow the injector to slip along the brake.

20. A system for handling eggs, comprising for each individual egg:
a movable gripper; and
a brake associated with the gripper, wherein the brake is configured to selectively apply, on the gripper, one of:
a high brake force to fixedly engage the gripper;
a low brake force to effectively allow free sliding movement of the gripper relative to the brake; and
an intermediate brake force to allow the gripper to slip along the brake.

* * * * *